(12) United States Patent
Angelescu et al.

(10) Patent No.: US 7,424,366 B2
(45) Date of Patent: Sep. 9, 2008

(54) TIME-OF-FLIGHT STOCHASTIC CORRELATION MEASUREMENTS

(75) Inventors: Dan Eugen Angelescu, Cambridge, MA (US); Thibaud Desbarbieux, Courcouronnes (FR); Jacques Jundt, Newton Highlands, MA (US); Edward Harrigan, Danbury, CT (US); Jerome Durivault, Annecy (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 47 days.

(21) Appl. No.: 11/511,137

(22) Filed: Aug. 28, 2006

(65) Prior Publication Data

US 2007/0061093 A1     Mar. 15, 2007

Related U.S. Application Data

(60) Provisional application No. 60/711,624, filed on Aug. 27, 2005.

(51) Int. Cl.
  *G01V 9/00* (2006.01)
(52) U.S. Cl. .................................................. 702/12
(58) Field of Classification Search .................. 702/6, 702/11, 12, 13; 73/1.24, 861.05, 861.95, 73/861.07; 175/48; 250/259, 260, 302; 374/136
See application file for complete search history.

(56) References Cited

U.S. PATENT DOCUMENTS

| 3,820,393 | A |   | 6/1974  | McGunigle |            |
|-----------|---|---|---------|-----------|------------|
| 4,507,974 | A |   | 4/1985  | Yelderman |            |
| 5,975,485 | A | * | 11/1999 | Tsai et al. | ............. 251/11 |
| 6,502,459 | B1| * | 1/2003  | Bonne et al. | ............. 73/170.11 |
| 6,527,835 | B1| * | 3/2003  | Manginell et al. | ............. 96/102 |
| 6,615,655 | B1| * | 9/2003  | Sakai et al. | ............. 73/204.26 |
| 7,181,261 | B2| * | 2/2007  | Silver et al. | ............. 600/345 |
| 7,225,683 | B2| * | 6/2007  | Harnett et al. | ............. 73/861.12 |
| 2002/0073772 | A1 | * | 6/2002 | Bonne et al. | ............. 73/204.11 |
| 2003/0002994 | A1 | * | 1/2003 | Johnson et al. | ............. 417/292 |
| 2004/0237645 | A1 | * | 12/2004 | Naguib et al. | ............. 73/204.27 |

(Continued)

FOREIGN PATENT DOCUMENTS

DE          3106530 A1       9/1982

(Continued)

OTHER PUBLICATIONS

Beck, "Correlation in instruments: cross correlation flowmeters", J. Phys. E.: Sci. Instrum., vol. 14, 1981.

(Continued)

*Primary Examiner*—Donald E McElheny, Jr.
(74) *Attorney, Agent, or Firm*—Jim McAleenan, Esq.; Vincent Loccisano, Esq.; Jody Lynn DeStefanis, Esq.

(57) ABSTRACT

The present invention recited a method and apparatus for measuring a parameter of a fluid within a fluid channel using a tracer element injection by an injection element and detected by a detection element at a location separate from the injection element location. The injection element and detection element of the present invention are in communication with a computational element, wherein the computation element is capable of measuring a parameter of a fluid in a fluid channel based upon time of flight data derived from the injection element and the detection element.

45 Claims, 15 Drawing Sheets

U.S. PATENT DOCUMENTS

2005/0063865 A1* 3/2005 Bonne et al. .............. 422/68.1
2005/0142662 A1* 6/2005 Bonne .................... 436/149
2006/0008382 A1   1/2006 Salamitou et al.

FOREIGN PATENT DOCUMENTS

| EP | 0232719 A1 | 8/1987 |
|----|-----------|--------|
| GB | 2412966 A | 10/2005 |
| WO | 9934198 | 7/1999 |

OTHER PUBLICATIONS

Baldauff et al., "Profiling and Quantifying Complex Multiphase Flow", Oilfield Review, Autumn 2004.

Miyara, "Measuring Air Flow Using a Self-Balancing Bridge", Analog Dialogue 5, 1, pp. 13-15, 1971.

Oddie et al., "Flow-Rate Measurement in Two-Phase Flow", Annu. Rev. Fluid Mech. 2004. 36:149-72.

Xiang et al., "Fast M-sequence Transform for Quasi-Backscatter Sonar in Fisheries and Zooplankton Survey Applications", ISCP'04 Proceedings, 2004 IEEE.

Yelderman, "Continuous Measurement of Cardiac Output with the use of Stochastic System Identification Techniques", Journal of Clinical Monitoring, vol. 6, No. 4, Oct. 1990, pp. 322-332.

Meng et al., "A Parylene MEMS Flow Sensing Array", Transducers 2003, 12th International Conference on Solid State Sensors, Actuators and Microsystems, Boston, Jun. 8-12, 2003.

* cited by examiner

TIME-OF-FLIGHT STOCHASTIC CORRELATION MEASUREMENTS

CROSS-REFERENCE TO RELATED APPLICATIONS

This application is related to and claims priority to Provisional Application No. 60/711,624, filed on Aug. 27, 2005 which is herein incorporated by reference in its entirety.

BACKGROUND OF THE INVENTION

1) Field of the Invention

The present invention generally relates to a time of flight method, apparatus and device for measuring a parameter of a flow, and particularly for measuring fluid flow rates using a pseudo-random sequence of tracer elements injected into a flow channel at a first location and detected at a second location.

2) State of the Art

Parameter measurement of a flowing fluid or gas has numerous applications in residential and commercial setting. One such parameter of particular interest is flow rate. Flow rate measurements are central to a variety of industries and applications. In some applications the flow to be measured may be a high volume flow through a large diameter pipe or fluid channel, or in the alternative may be a low volume flow through a micro fluidic channel. Additionally, these flows may be gas flows, liquid flows or some combination of both gas and liquid flow. Furthermore, the flow may be a single phase or multi-phase flow. While these various flows span numerous applications, one such environment and application is the oil and natural gas industry. The oil and natural gas industry encounters a variety of the aforementioned flow types in a variety of settings, spanning downhole reservoirs flow rate analysis to production logging flow rate analysis, to monitoring the injection of synthetic fluids (such as fracturing fluids) into the rock formation, to monitoring flow within a flowline or within channels inside a tool, to surface operations. These various operating environments each present a variety of flow analysis challenges.

In a downhole flow analysis environment, for example, the naturally occurring hydrocarbon fluids may include dry natural gas, wet gas, condensate, light oil, black oil, heavy oil, and heavy viscous tar. In addition, there may be flows of water and of synthetic fluids, such as oils used in the formulation of drilling muds, fluids used in formation fracturing jobs etc. Each of these individual fluids presents vastly different physical properties, yet all may pass through a single flow channel for measurement.

As the economic value of a hydrocarbon reserve, the method of production, the efficiency of recovery, the design of production hardware systems, etc., all depend upon a number of flow parameters, such as physical properties, phase behavior and flow rates of the fluid, it is important that the flow parameters be determined accurately.

Additionally, in a production logging environment it is preferred to have knowledge of the flow velocities for different phases such as oil, water and gas at different places axially and radially in the production pipe so that one may have a proper understanding of oil production and well development. Ideally, a flow measurement should cover a wide range of flow rates, should work irrespective of fluid composition or phase (oil, gas or water), and should provide a local measurement (so that a map of the flow across the borehole can be created) without perturbing flow. A useful addition to these elements would be the potential to apply the same measurement scheme in a miniaturized geometry, such as a micro fluidic device. The assignee of this application has provided a commercially successful production logging tool, the FSI (Flow Scan Imager) which is capable of performing flow rate analysis of formation fluids. The present invention may be incorporated into this tool, or any other production logging environment, for the analysis of formation fluids.

Several measurement principles have been attempted in the past to measure such flows for the hydrocarbon industry and other industries. For gas flow, thermal anemometers are widely used. Spinners are being used in production logging to measure liquid and gas flow. Venturi pressure drop, Coriolis flowmeters, electromagnetic, cross-correlation flow meters, gamma-ray absorption, gradio-manometer densitometers, local electrical and fiber-optic sensors have all been applied to measurements of single- or two-phase flow. In addition, techniques based on thermal tracers and stochastic techniques have been developed for measuring blood flow velocity inside arteries as recited in U.S. Pat. No. 4,507,974 to Yelderman, which is herein incorporated by reference. Micro-scale time-of-flight sensors using thermal tracers, albeit without the added benefit of using correlated sequences, have been reported in the scientific literature (E. Meng, Y.-C. Tai: "A PARYLENE MEMS FLOW SENSING ARRAY", Proceedings of the 12th International Conference on Solid State Sensors, Actuators and Microsystems, Boston, June 8-12, p. 686, 2003). Inherent in many of these existing techniques, however, is the inability of unobtrusively measure a parameter of a fluid, such as flow rate, in an accurate manner regardless of the flow rate and composition of the flow.

SUMMARY OF THE INVENTION

It is therefore an object of the invention to provide methods, devices and apparatus for time of flight measurements of a parameter of a flow. These methods, devices and apparatus include an injection element located at a first location, wherein the injection element is capable of introducing a tracer element into the flowing fluid. Furthermore, a second location at a fixed distance from the first location includes a detection element capable of detecting the tracer element after it has traversed the distance between the first location and the second location. Associated with, and in communication with the first and second locations is a computation element capable of calculating a parameter of the flowing fluid using time of flight measurements.

It is also an object of the invention to provide methods, devices and apparatus for measuring fluid flow in a flow channel. This flow measurement is accomplished by introducing a tracer element into the fluid channel by an injection element at a first locations. This tracer element is detected at a second location by a detection element. Data relating to the injection element and the detection element is communicated to a computation element such that the computation element computes a time of flight flow rate measurement of the flowing fluid.

DETAILED DESCRIPTION OF THE INVENTION

Figure 1:
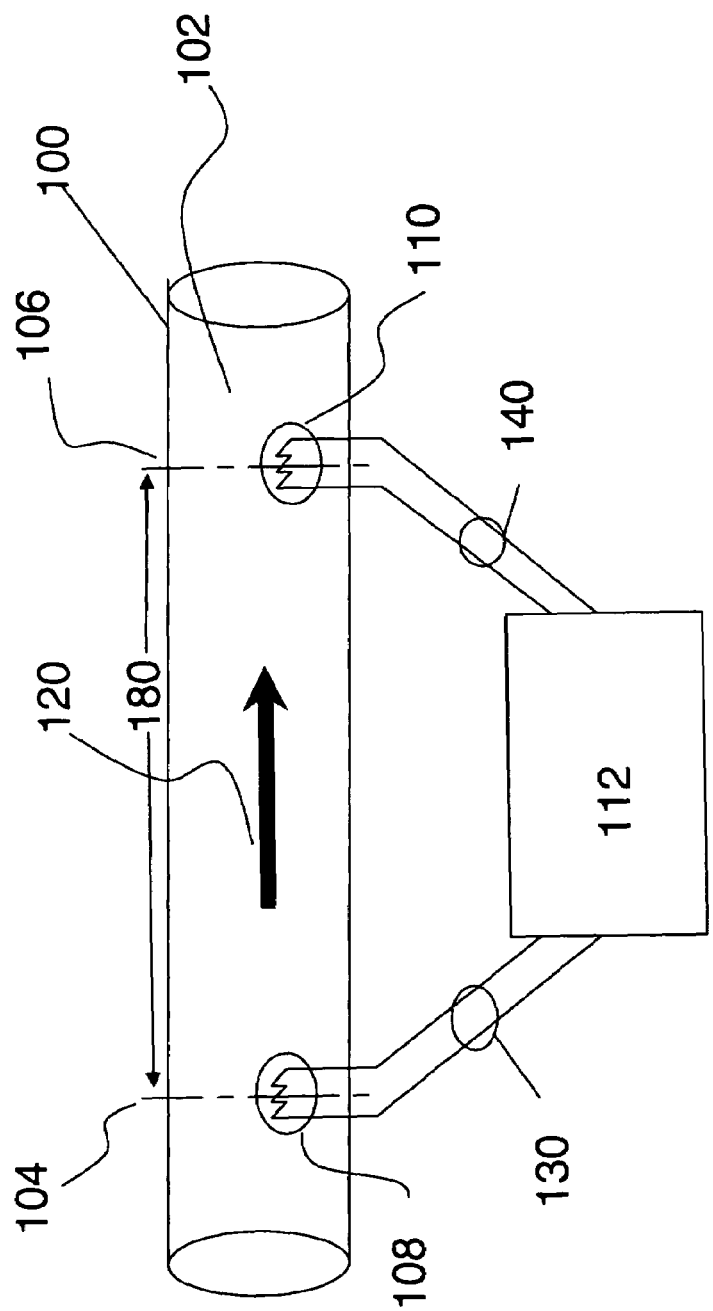
FIG. 1 is an illustrative example of one embodiment of the present invention for use in measuring a fluid parameter of a flowing fluid.

Various embodiments and aspects of the invention will now be described in detail with reference to the accompanying figures. This invention is not limited in its application to the details of construction and the arrangement of components set forth in the following description or illustrated in the drawings. The invention is capable of various alternative embodiments and may be practiced using a variety of other ways. Furthermore, the terminology and phraseology used herein is solely used for descriptive purposes and should not be construed as limiting in scope. Language such as "including," "comprising," "having," "containing," or "involving," and variations herein, are intended to encompass the items listed thereafter, equivalents, and additional items not recited. Furthermore, the term "first location" is used herein to include any location at a know position along a fluid channel wherein an "injection element" may be located. Additionally, the term "second location" is defined herein to include any location at a fixed difference apart from the first location wherein a "detection element" may be located. The term "tracer element" is herein used to describe an external influence which may be applied to a flowing fluid in a flow channel such that a measurable perturbance is generated within the flowing fluid.

The present invention recites a time of flight measurement apparatus, method and device for measuring a parameter of a flowing fluid. In the preferred embodiment of this invention, the parameter of interest is flow rate of the fluid. While the present invention is applicable to a variety of single phase and multiphase fluids, for clarity a flowing hydrocarbon fluid will be discussed. Such a selection is not intended to be limiting in scope, as one skilled in the art will readily recognize that the methods and techniques of the present invention are applicable to a variety of industries, applications and fluids.

As illustrated in FIG. 1, a flowing fluid 102 contained within a flow channel 100 is illustrated. In the present illustration, this fluid has a fluid direction 120. This flowing fluid may be a single phase fluid or may be a multi-phase fluid. Fluids typically encountered in a downhole environment may include various components such as oil, gas and water. As illustrated in FIG. 1, a first location 104 is disposed along the fluid channel 100. This first location includes an injection element 108 capable of injecting a tracer (not shown) into the flowing fluid 102. This tracer will be discussed in greater detail below. One skilled in the art will readily realize, however that this tracer element (not shown) may take numerous forms, including but not limited to a heat tracer, a radioactive tracer or a chemical tracer. Located at a secondary position along the fluid channel 100 is a second location 106. This second location 106 further includes a detection element 110. The detection element is orientated such that the detection element 110 is in communication with the flowing fluid 102 within the fluid channel 100. Furthermore, the distance between the first location 104 and the second location 106 is a fixed and know distance 180.

Additionally, a computation element 112 is illustrated in FIG. 1 of the present invention. This computation element 112 is in communication with the injection element 108 disposed at the first location 104 using a communication pathway 130. Furthermore, the computation element 112 is additionally in communication with the detection element 110 disposed at the second location 106 using a communication pathway 140. Using data from the injection element 108 and the detection element 110, the computation element 112 is capable of cross correlating this data to measure a parameter of the flowing fluid 102 in the flow channel 100. Data obtained by such a cross correlation regime is illustrated in FIG. 2E of the present invention, which will be discussed in greater detail below.

The illustration of a single first location 108 and detection location 110 in FIG. 1 is solely for illustrated purposes and is not intended to be limiting in scope. One skilled in the art will recognize that alternative collections and orientations of detection elements and injections elements may be provided. A non-exhaustive selection of embodiments are illustrated in FIGS. 2A and 2B.

Figure 2A:
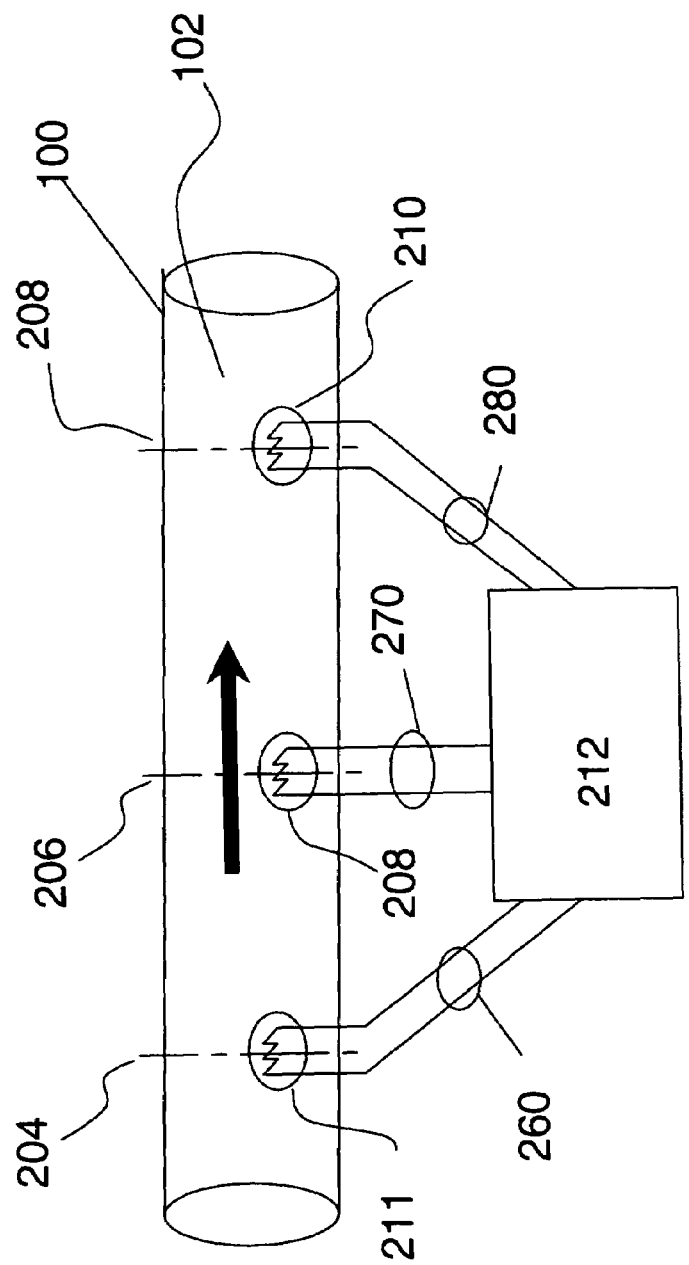
FIG. 2A is an illustrative example of an alternative embodiment of the present invention for use in measuring a fluid parameter of a flowing fluid.

FIG. 2A illustrates the use of a plurality of detector elements 210,211 at locations upstream and downstream of the injection element 208. Using the arrangement of detectors and injector of the present embodiment, the direction of flow may be determined. On skilled in the art will recognize that numerous alternative uses of the detector elements 210,211 and injector element 208 may be accomplished in accordance with the present embodiment. In the present embodiment, it will be assumed that a fluid is flowing in the direction of the illustrated arrow, thereby allowing for "upstream" and "downstream" terminology. This assumption is solely for clarity and illustrative purposes, as the present embodiment provides for the detection of flow direction without prior knowledge of flow direction. Furthermore, the present embodiment, as illustrated, allows for the monitoring of flow direction such that flow reversals may be determined.

In the illustrated embodiment, a detection element 211 at a detection location 204 is locate upstream of the injection element 208 at first location 206. The flowing fluid 102 therefore first passes detection element 211 before reaching injection element 208. Located downstream from the first location 206 is a second detection element 210 located at a detection location 208. Each of these detection elements 210,211 and injection element 208 are in communication with the computation element 212 using communication pathways 260,270, 280.

Figure 2B:
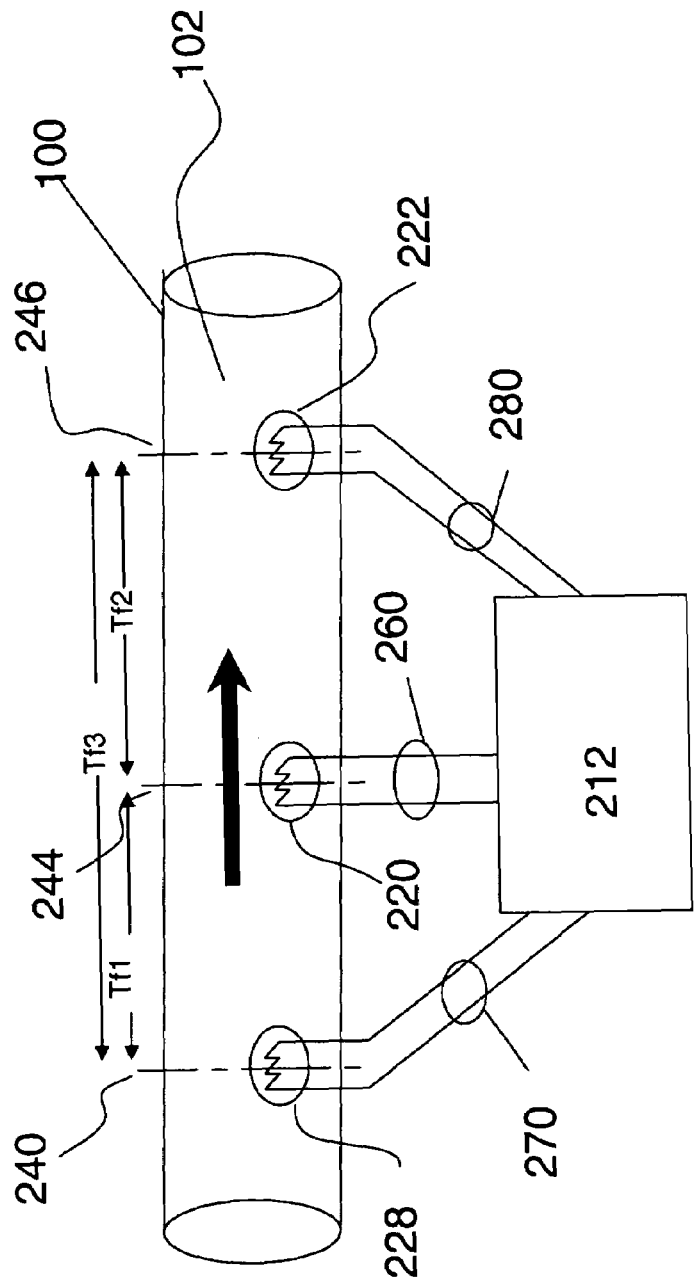
FIG. 2B is an illustrative example of an alternative embodiment of the present invention for use in measuring a fluid parameter of a flowing fluid.

Furthermore, FIG. 2B illustrates an alternative embodiment of a suitable arrangement of injection elements 228 and detection elements 220,222. A flowing fluid 102 contained with the fluid channel 100 first passes first location 240 wherein injection element 228 injects a tracer element (not shown) into the fluid flow 102. This tracer element is subsequently detected by detection element 220 at detection location 224 and finally detected by detection element 222 at detection location 246. Data from the injection element 228 and the detection elements 220, 222 is communicated to the computational element 212 using communication pathways 260,270,280. One skilled in the art will readily recognize that numerous suitable communication pathways may be utilized with the present invention such as, but not limited to, hard-wired, optical or wireless communication pathways. In both FIGS. 2A and 2B, the distance between the first location and the detection locations are fixed and known. In the present embodiment, a tracer element injected by the injection element 240 can be first detected by a detection element 220. Additionally, as this tracer traverses the distance from the detection element 220 to the detection element 222, the signal can be detected a second time at detector 222. The computation element 212 can compute a flow rate of the flowing fluid within the fluid channel 246 by cross correlating data derived by the two detectors, and thus deriving the time of flight between the two detectors. In such an arrangement, the measured flow rate exhibits a minimized dependence on fluid properties, as well as improved linearity.

Figure 2C:
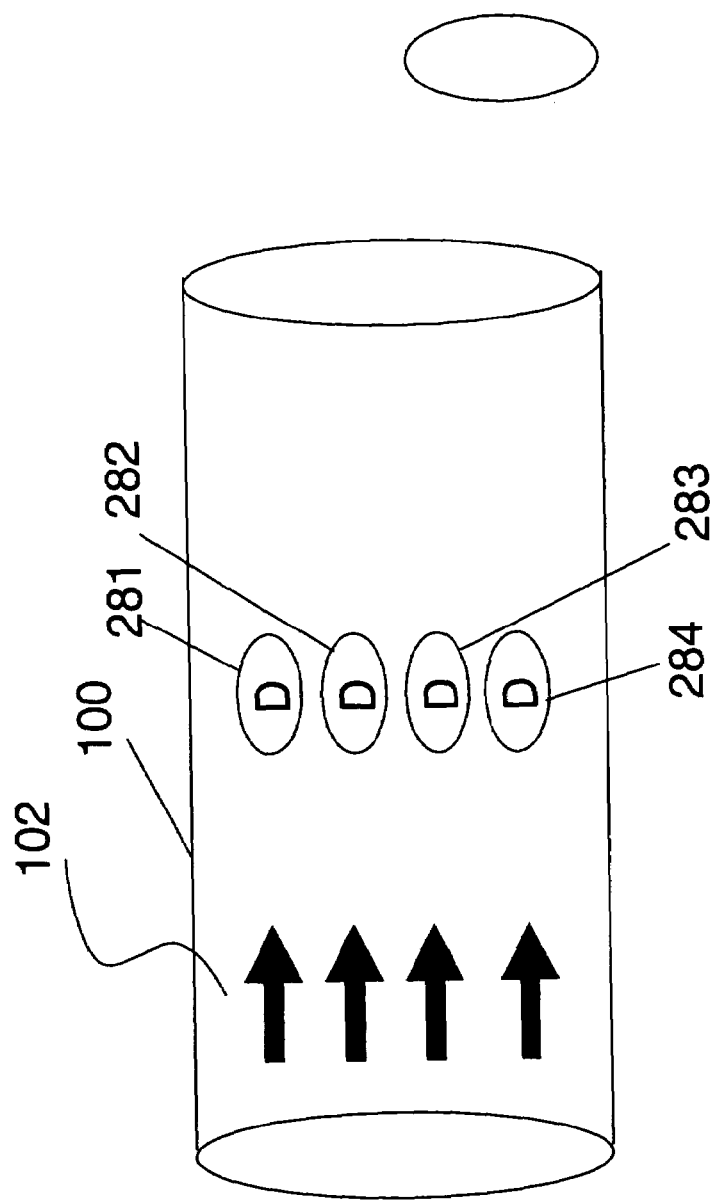
FIG. 2C is an illustrative embodiment of an arrangement of detector elements within a fluid channel in accordance with one embodiment of the present invention.
Figure 2D:
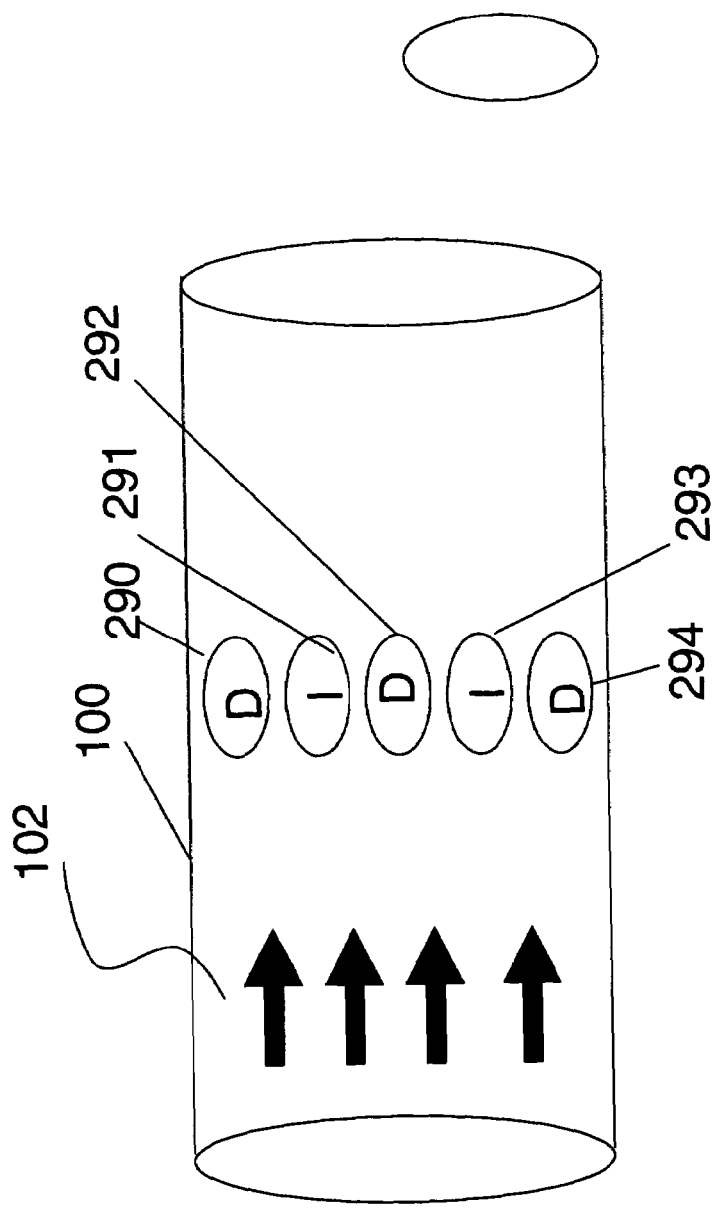
FIG. 2D is an illustrative embodiment of an arrangement of detector elements and injector elements within a fluid channel in accordance with one embodiment of the present invention.
Figure 2E:
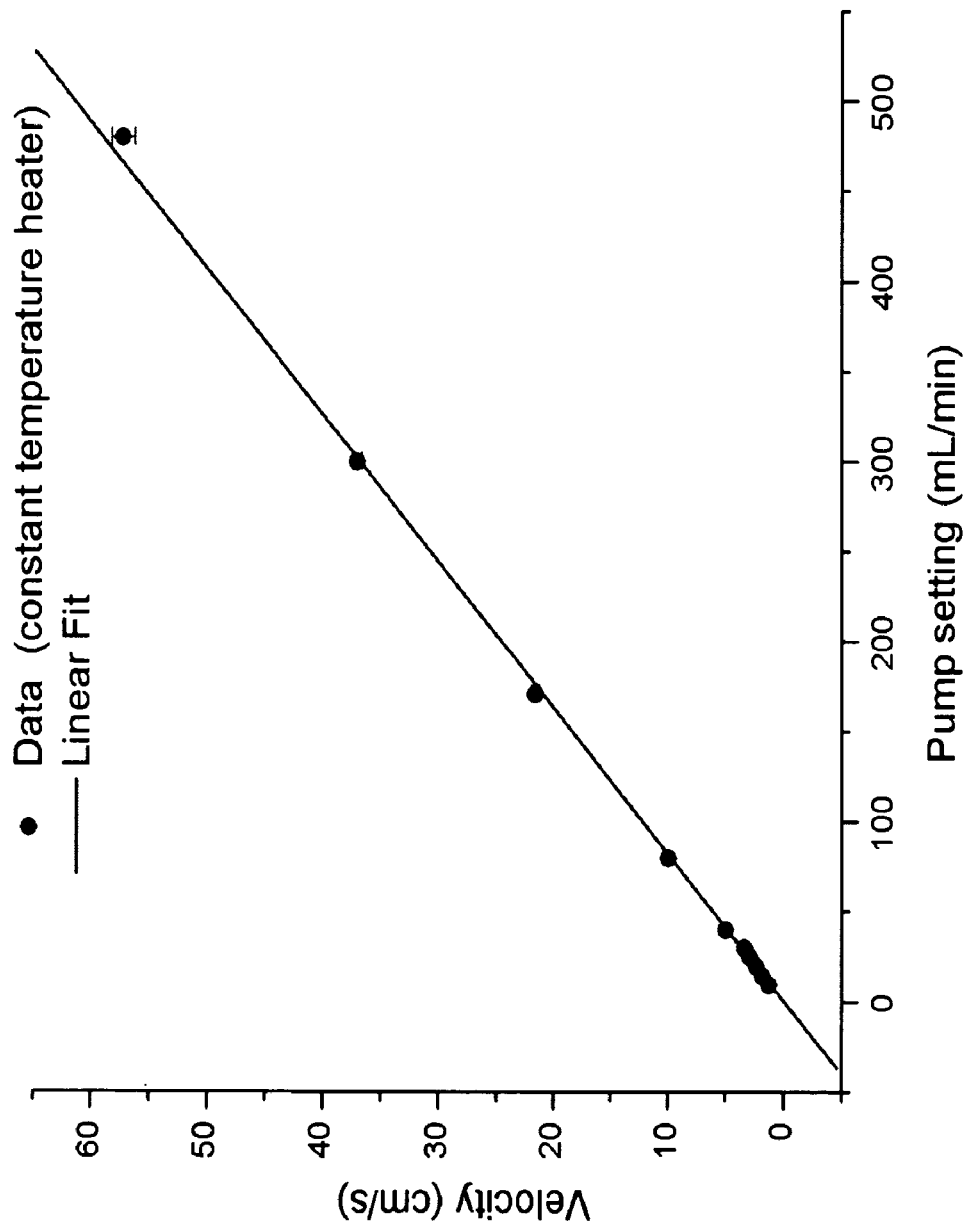
FIG. 2E is an illustrative embodiment of data, in accordance with one embodiment of the present invention, obtained from measuring flow rate in a flow line of 5 mm diameter.
Figure 2F:
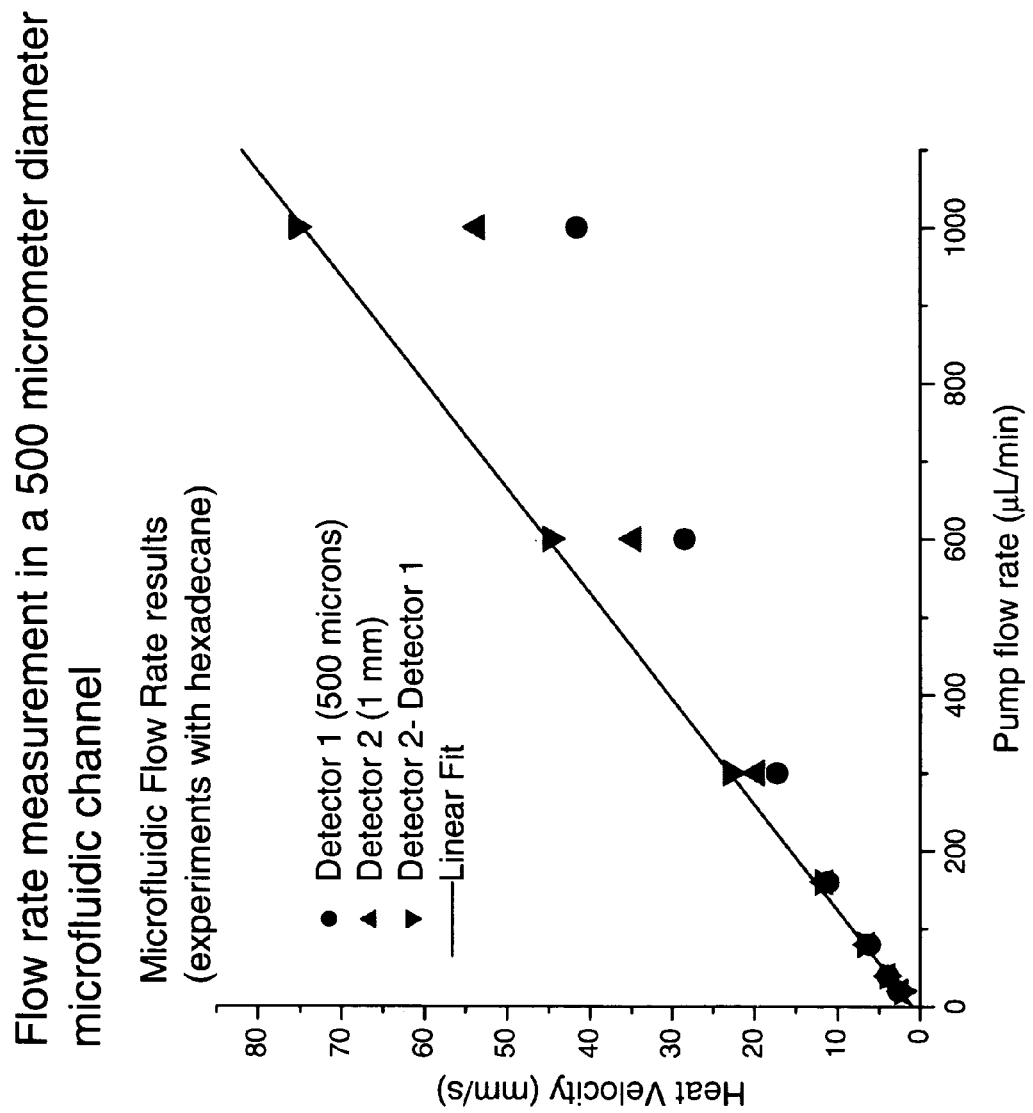
FIG. 2F is an illustrative embodiment of data, in accordance with one embodiment of the present invention, obtained from measuring flow rate in a microfluidic channel of 500 micrometers diameter.

In an alternate embodiment of the present invention, the arrangement of FIG. 2B may be utilized to measure a first time of flight measurement (Tf1) spanning the distance from the injection element 240 to the detection element 220. An additional time of flight measurement (Tf2) may be recorded, wherein this time of flight measurement spans the distance from the injection element 240 to the detection element 222. The computation element 212 can cross correlate between the two detectors 220 and 222 or can correlate data received at each detector 220,222 with data provided by the injector 228 in order to measure Tf1, Tf2 and use the difference Tf2-Tf1, representing the time of flight between the two detectors, to calculate the flow velocity. This embodiment also presents minimized dependence on the fluid parameters, as well as improved linearity. The linearity improvement using this technique is illustrated in FIG. 2F of the present invention. As illustrated in FIG. 2F, linearity is improved in experiments by separately correlating the data between the two detectors and the injector to calculate the times of flight Tf1 and Tf2, and then using the difference Tf2-Tf1 to obtain a measure of fluid velocity based on the time of flight between the two detectors.

One skilled in the art will recognize that the alternate embodiments illustrated in the present invention, namely FIGS. 2A and 2B are not representative of all potential embodiments. For example, a plurality of detector elements may be located at a single detection location such that these detection elements are arranged to communicate with fluid in various regions of the flow channel. Locating a plurality of detection elements at a single detection location is beneficial in multiphase fluids flowing in a flow channel, wherein the composition or direction of fluid flow is different at various points in a plane perpendicular to the fluid flow direction.

Additionally, a number of injector elements may be located at different positions in the fluid channel, and each of these injection elements may deliver a different tracer element to the flowing fluid, which can then be detected and identified by the plurality of detectors at various positions within the fluid channel. For example, when using a heat pulse as a tracer element, various heat pulse signatures can be delivered by one or more injection elements such that these different heat pulse signatures can be detected at various positions within the fluid channel. Such an arrangement is illustrated in FIG. 2C, wherein a plurality of detection elements (282,282,283,284) are orientated along an axis perpendicular to the flow of a fluid 102 through a flow channel 100. Additionally both the detection elements and injections elements of the present invention may be co-located at a single location along the flow channel. One such example is illustrated at FIG. 2D wherein at a single location along the flow channel 100 having a fluid with a flow direction 102, both detector elements 290,292,294 and injector elements 291,293 are co-located at a single location. The present invention, when used in conjunction with that which is recited in FIG. 2D, as well as an additional location having opposing detectors and injectors, provides a means by which parameter measurements a variety of locations within a flow channel may be calculated. One skilled in the art will readily recognize that numerous alternative embodiments and arrangements of detectors and injectors may be employed in accordance with the present invention.

In accordance with the present invention, the injector element and detection element may take numerous forms. The selection of an appropriate injector element and detector element has numerous criteria associated with such a selection, including the anticipated flow rate of the fluid in a flow channel, the material properties of the fluid and the size of the flow channel. These are examples of a non-exhaustive list of design criteria.

Furthermore, one skilled in the art will readily appreciate that based upon the selected tracer element, an injection element and detection element may take the same form. For example, when practicing the present invention using a thermal tracer, a thermal transducer can be utilized to both inject the heat pulse as well as detect the heat pulse. In view of this, a detection or injection element used in accordance with this invention may exhibit the same physical form or construction methods, yet differ in its use as an element capable of introducing a tracer or detecting a tracer. The present invention, therefore, is not intended to be limited by the terminology "injection element" and "detection element" as these elements may be one in the same.

Additionally coupled with injector and detector selection is the anticipated tracer element used in conjunction with the present invention for measuring a parameter of a fluid flowing in a flow channel. Essential in any selected tracer element is the ability to induce a perturbation in the flowing fluid. Suitable tracer elements include chemical or dye tracers, radioactive tracers as well as the use of heat as a suitable tracer element. For the purposes of illustration, the use of heat as a suitable tracer element will be detailed below. Such a choice is for illustration purposes and is not intended to be limiting in scope of the present invention. Additionally, the use of heat is generally phase independent (as compared to dyes, which have to be chosen according to the phase of interest—oil dyes for the oil phase and water dyes for the aqueous phase). Furthermore, thermal pulses can be generated and detected locally and with rapid response times, thus resulting in a local flow measurement.

The use of a heat tracer element in accordance with the present invention may include a tracer element capable of providing a thermal pulse. As used in the description of the present embodiment the terms "tracer element", "heat pulse", "heat tracer", "tracer pulse", "thermal pulse" and "tracer" shall be used interchangeably. In one embodiment, heat pulses can be generated by an injection element that is capable of rapid heating a preferably miniaturized heater to a given temperature, and then maintain that temperature constant over the period of one pulse. In accordance with one embodiment the heater is miniaturized to provide rapid heating and cooling. During the period of the pulse, several parameters such as the electrical power sent to the heater during a pulse, as well as the time it takes to reach the ambient temperature at the end of a pulse can be monitored. Such monitoring can be accomplished using the computation element of FIGS. 1 and 2A-2B Alternative monitoring embodiments exist, as understood by one skilled in the art, and may be readily utilized in practicing the present invention. These monitored parameters are affected by both thermal conductivity, specific heat and by flow rate of the fluid, and can be used to detect the type of ambient fluid (oil, water or gas). Driving the heater in a constant temperature regime also protects it from overheating.

Figure 3:
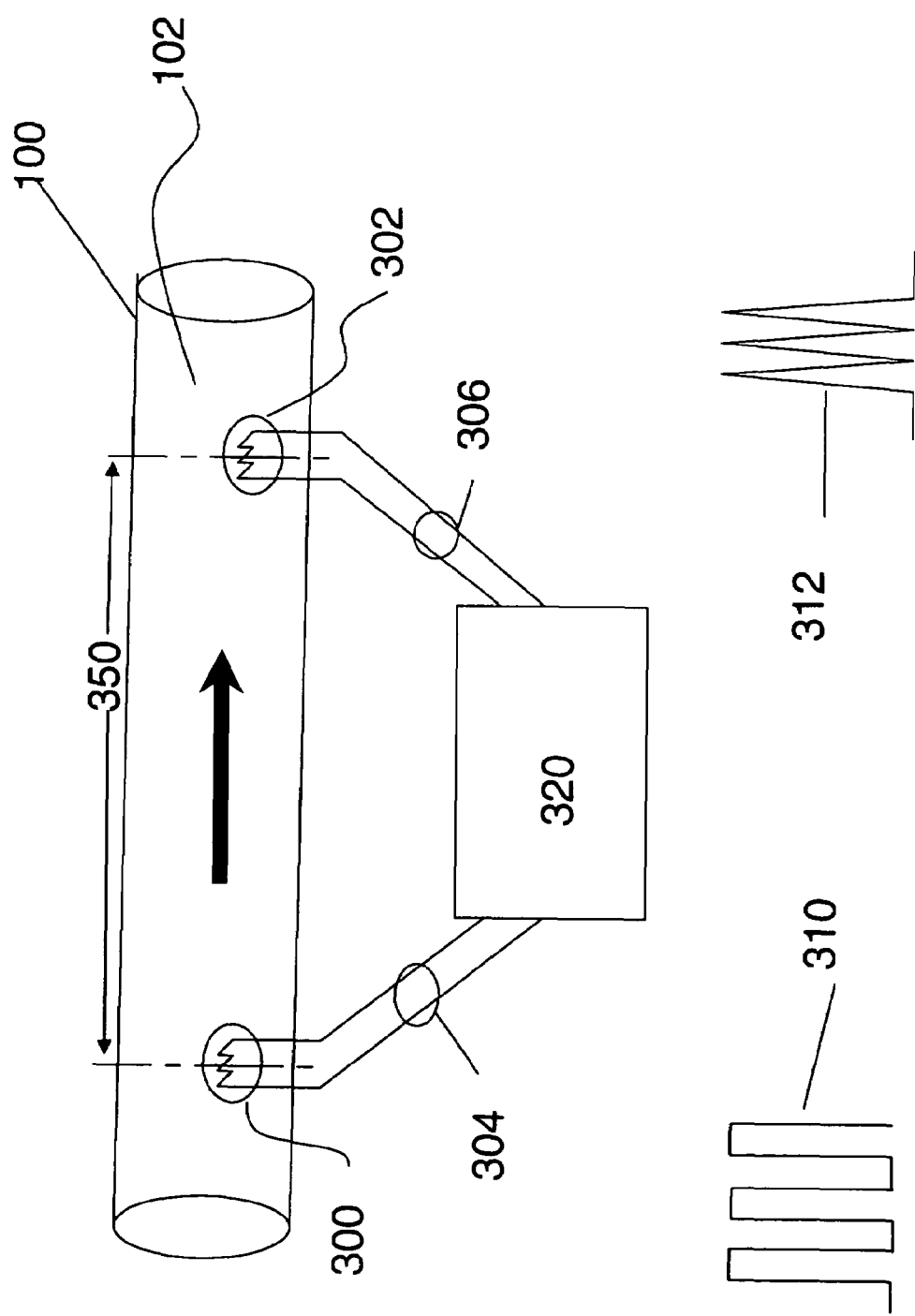
FIG. 3 is a schematic diagram of a system for calculating a fluid parameter according to one embodiment of the present invention.

Additionally, in accordance with the present invention the tracer is detected by a detection element also in communication with the computational element. Upon detection of the heat pulse by the detection element, the computation element of the present invention cross correlating the detected signal with the injected sequence to determine a parameter of the flowing fluid. As set forth prior, the illustrated parameter will be fluid flow velocity. A basis example of a suitable arrangement of injector element and detector element, wherein the tracer is a heat pulse, is illustrated in FIG. 3. An injection element 300 capable of delivering a heat pulse 310 is in communication with a flowing fluid 102 in a flow channel 100. A variety of suitable injection heat pulses 310 may be used in accordance with the present invention. One embodiment of the present invention utilizes tracers having special correlation properties very similar to those of white noise. A suitable tracer is an "M-Sequences" to be described in detail below.

This heat pulse is then detected by a detection element 302. The detected heat pulse 312 differs from the injected heat pulse 310, due to various reasons such as: diffusion of the heat into the fluid, conduction of heat by the channel walls, non-uniform advection, limited response time of the heaters and detectors.

In communication with both the injection-element 300 and the detection element 302 is a computation element 320. Communication between injection element 300 and computation element 320 occurs over communication pathway 304. Communication between detection element 302 and computation element 320 occurs over communication pathway 306. Upon reception of data from the detection element 302, the computation element 320 can cross-correlate the data received from the detection element 302 with data relating to the tracer delivered to the injection element 300 to produce a correlation profile.

Figure 4:
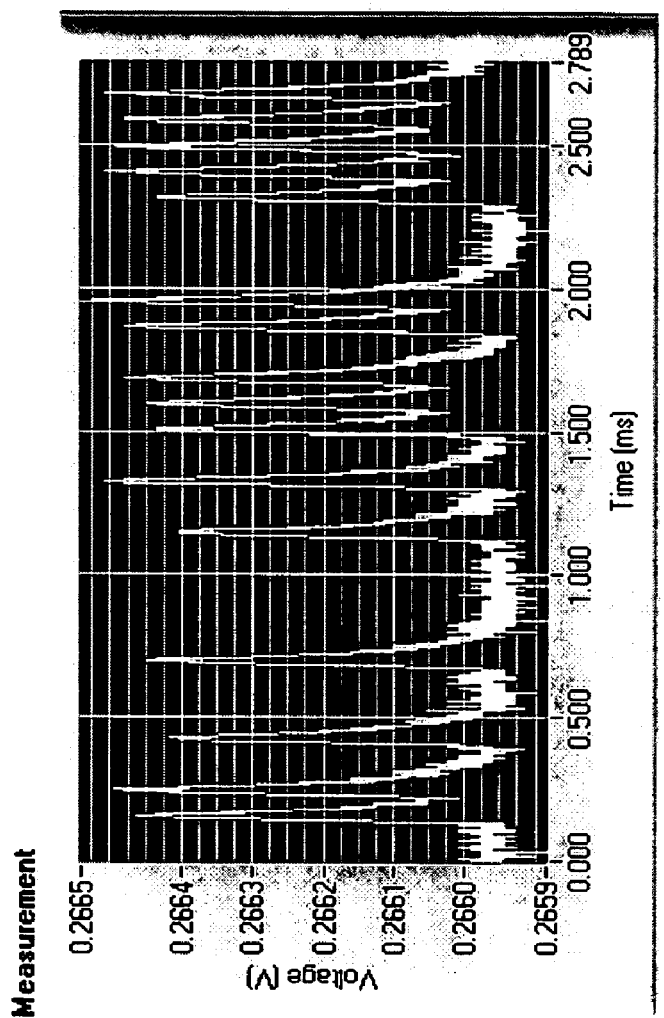
FIG. 4 is a representation of data detected by a detection element in accordance with one embodiment of the present invention.
Figure 5:
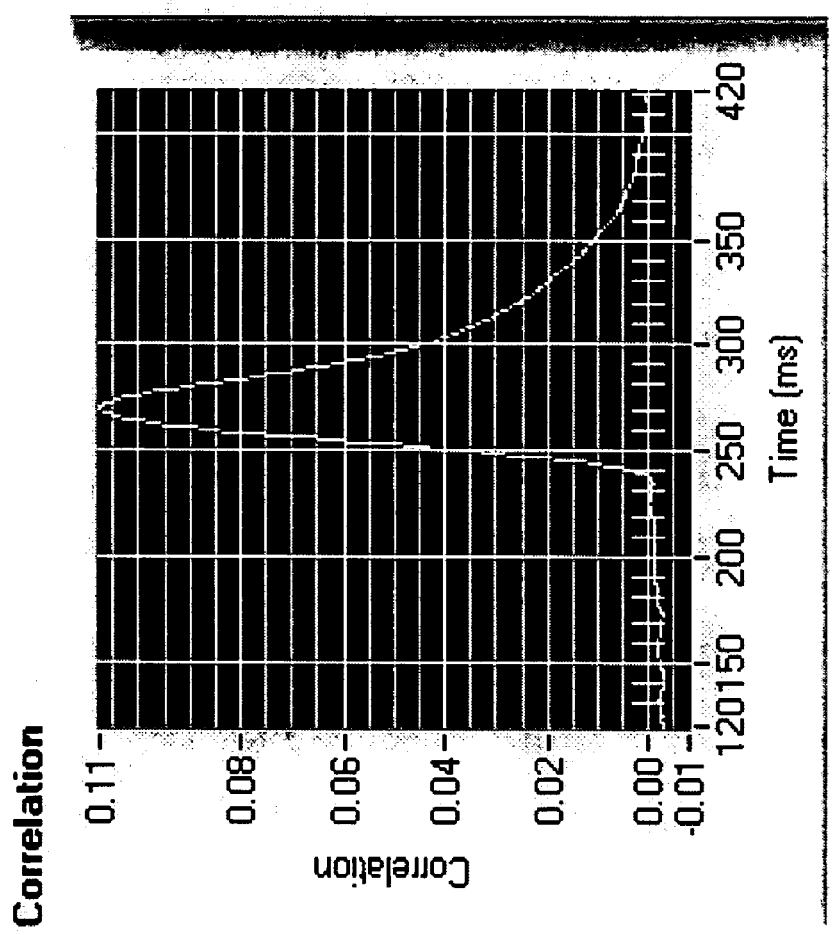
FIG. 5 is a representation of correlation data in accordance with one embodiment of the present invention.

In accordance with one embodiment of the present invention, a tracer element comprised of a series of pulses may be injected. In accordance with one embodiment pulses with a duration of 15 ms, spaced 90 ms apart may be employed. Using such a pulse sequence injected by an injection element, an example of data received from the detection element is illustrated in FIG. 4. Following cross-correlation of this data of FIG. 4 with data describing the tracer delivered by the injection element 300, a resulting data representation, as illustrated in FIG. 5, is generated. This cross-correlated data of FIG. 5 has a significantly higher signal-to-noise ratio. The position of the correlation profile peak indicates the time-of-flight duration of the tracer element as it traveled from injection location to detection location. The fluid flow velocity can thus be inferred by dividing the injection element location to detector element location distance 350 by the time-of-flight obtained from the correlation profile. This measurement is scalable from measuring flow in micro fluidic channels (tens to hundreds of microns in diameter) to measuring flow in a flow line (such as Schlumberger's MDT), to measuring flow in a production logging environment, to measuring flow in various surface operations.

One skilled in the art will notice that the peak of the cross-correlation function may not be precisely equal to the time of flight, for several reasons, explained below. The fluid flow around the heater and detector elements is affected by their solid presence: at the surface of the heater and detector elements, the flow is stationary. The fluid flow lines thus curve around said elements, and the high flow velocities are only recovered a certain distance away from the elements. Heat requires a certain time to diffuse through these essentially stationary layers into the regions of high flow (in the case of the heater element), or from the high flow regions to the detector element. This diffusion time is roughly governed by the geometry of the heater element, detector element and confining fluid pipe or channel, and also by the fluid thermal properties.

This diffusion time adds to the flow advection time. This becomes an issue at high velocities, where the flow advection time becomes short, comparable to the diffusion time. In such cases, the measured time-of-flight is significantly longer than the actual time-of-flight, and the measurement results in a velocity lower than the actual fluid velocity, and that furthermore depends on the thermal properties of the fluid. This effect can be eliminated by the use of two identical detector elements, placed at consecutive locations in the flow (FIG. 2B). In this case, by measuring the cross-correlation functions of the two detected signals with the injected heat tracer signal, and subtracting the corresponding times-of-flight, one obtains the time of flight between the two detectors, where the diffusion times do not play a role anymore. By dividing the distance between the detectors by this time of flight, an accurate measurement of velocity can be obtained that is independent of fluid properties or specific geometrical constraints. Fig. B clearly illustrates the benefits of this technique to improve linearity and accuracy of the measurement. This effect may also be counteracted by applying a theoretical model Similarly, at low velocities, the peak of the correlation peak may appear earlier than the actual advection time. This effect has a different cause, namely the dissipation of heat into the fluid and into the adjacent walls. This may cause the temperature at the detector to peak early, leading to deceivingly short times of flight. This effect can be counteracted by proper calibration, or by using different measurement techniques that are more sensitive at low velocities (see below, i.e. by monitoring the power required to maintain the heater at constant temperature (anemometric mode), or measuring the time required for heater temperature to decay to ambient temperature once the heater power has been switched off). This effect may also be counteracted by applying a theoretical model.

As set forth prior, appropriate selection of a suitable tracer element is necessary to accurately measure a fluid parameter of a flowing fluid in a flow channel. In accordance with the present invention, a properly selected tracer element, having an appropriate signature or pulse profile, aids in utilizing cross-correlation techniques. To appropriately use cross-correlation techniques on data from an injection element at a first location and a detection element at a second location, it is necessary to locate the peak of the cross-correlation function between a measured signal (produced by some perturbation to uniform flow) either with a similar measurement performed at a first location, (in the case of a spontaneous perturbation), or with the signal causing the perturbation (i.e. the tracer element), in the case of an induced perturbation. The correlation peak time is a measure of the time-of-flight between the injection element at the first location and the detection element at the second location. When this data is combined with knowledge of the separation distance between the first and second location, a flow velocity measurement may be derived.

One example of possible profile for a train of tracer pulses is a pseudo-random noise sequence, which exhibits a compact cross correlation profile.

One example of such suitable tracer element is an M-sequence. A M-Sequence includes $2^N-1$ numbers $a_i$ which can take values of +1 or −1, and which satisfy the following property:

$$\sum_{j<i\leq 2^N-1} a_i a_{i-j} + \sum_{1\leq i\leq j} a_i a_{2^N-1+i-j} = 2^N \delta_j - 1 \quad (1)$$

where we define the discrete delta-function as:

$$\delta_k = \begin{cases} 1 & (k = 0) \\ 0 & (k \neq 0) \end{cases} \quad (2)$$

In other words, such sequences are very well correlated with themselves, but completely uncorrelated with any circular permutation of themselves. Using such a sequence as a tracer element aids in improving the signal-to-noise ratio in time-of-flight measurement in accordance with the present invention. Furthermore, such a tracer element aids in maintaining a low level of instantaneous power sent to the injection element, without significantly increasing measurement duration.

For example, a series of tracer pulses could be injected at times $t_i=i\Delta t$ which correspond to $a_i=1$ in an M-Sequence ($\Delta t$ is a predefined time interval, preferably longer than, or equal to, the duration $\Delta T$ of the tracer pulse); no pulse is generated when $a_i=-1$. A continuous periodic pulse train of period $T_{seq}=(2^N-1)\Delta t$ can be generated by resetting the counter i every time it reaches value $2^N-1$, which corresponds to the end of the M-sequence. We define the continuous injection function $$a(t) = \begin{cases} -1 & \text{if } t - t_i < \Delta T \text{ and } a_i = -1 \\ +1 & \text{if } t - t_i < \Delta T \text{ and } a_i = +1 \\ 0 & \text{otherwise} \end{cases} \quad (3)$$

which we extend beyond $T_{seq}$ by imposing periodicity.

The injected tracer pulses are injected at a first location by an injection element and travel with the flowing fluid within the flow channel. They are then detected by one or several detection elements at a locations downstream of the first location, where a signal f(t) is recorded over a length of time equal to $T_{seq}$. The cross-correlation function $C(\tau)$ can be calculated from:

$$C(\tau) = \int_0^{0+T_{seq}} f(t) a(t-\tau) dt \quad (4)$$

The correlation function obtained is essentially the continuum extension of Eq. (1). The correlation will be strong when the detected signal is in phase with the injection function (corresponding to j=0 in Eq. (1)), which happens at a value of τ equal to the time-of-flight for the pulses modulo $T_{seq}$. For all other values of τ the detected signal will be out of phase with the injected sequence, canceling in the correlation integral (4). Cancellation such as this corresponds to j≠0 in Eq. (1).

The resulting data is the single-pulse response of the system, but with enhancement of the signal (due to the summation of several injection peaks) and significant noise suppression (random noise is not correlated with the injection function a(t)). This feature is particularly interesting because it allows time-of-flight measurements with minimal intrusion, namely the intensity of the tracer pulse does not need to be increased unnecessarily. For example, be it dye concentration for optical or nuclear tracers, temperature for thermal pulses or any other tracer element as understood by a skilled artisan, the present technique affords arbitrary increases in signal-to-noise ratio by simply increasing the length of the M-sequence used. It is notable that this method is greatly superior to simple averaging of several pulses, since it allows a very dense "packing" of pulses into a pulse train instead of waiting for each pulse to reach the detector before sending the next one. The time required to perform a measurement is thus greatly reduced as compared to traditional averaging techniques.

The period $T_{seq}$ imposes the limit on the maximum time-of-flight (or, equivalently, minimum flow rate) that can be unambiguously detected by this method, whereas pulse duration $\Delta T$ (or, ultimately, the time resolution of the detection electronics) imposes a limit on the minimum time-of-flight (corresponding to the highest flow rate). Together with the distance between the heater and the detector, they define the limits within which flow rate can be measured accurately. In the preferred embodiment, $T_{seq}$ should be maximized while maintaining $\Delta T$ as short as possible. It is preferred that in all applications, the time resolution of the measurement (resulting from e.g. data rate, or analog to digital conversion rate) be maximized within practical limits. In optimizing such a measurement, the preferred embodiment provided the means to generate and, respectively, detect pulses of the shortest practical duration.

It is however understood that the duration of the pulses cannot be reduced arbitrarily, as in that case the amount of heat injected into the fluid would become extremely small and difficult to detect. The ideal duration of the pulses that provide the most accurate measurement of the flow rate depends on a number of parameters, most notably on the flowrate to be measured. In particular, for low flow rates, where the time of flight is long but dissipation is important, the ideal pulse duration may be longer than at high velocities, where dissipation is less important but time of flight is short and thus a very accurate narrow peak is required.

In one embodiment, the protocol for measuring flow rate may first employ a general-purpose pulse injection sequence to roughly determine the flow regime but with limited accuracy, and may adapt the sequence to the actual flow regime to provide a more accurate measurement, depending on the results of the initial measurement.

As set forth prior, the preferred embodiment of this invention relies on using a tracer element that includes thermal pulses, which are injected by an injection element at a first location and detected by a detection element at a second location along the flow channel. In the context of injected tracer elements that are thermal pulses reducing the instantaneous power of the heat signal by using correlated sequences (such as the M-Sequences discussed above) is beneficial as excessive temperature swings can lead to non-linearity in measured data or even catastrophic events. For example, bubble generation in the region surrounding the heater results in non-linearity of the associated measurements. Additionally, filament overheating is one of the more common causes for heater failures.

When utilizing a thermal pulse as a tracer element, the appropriate injection element may be a heater and a suitable detection element may be a temperature sensor located downstream from the heater. One skilled in the art will recognize that a variety of suitable heaters exist, including a heater having a heating filament. Suitable filaments include metallic filaments, such as those made of Tungsten commonly used in lighting, which offer the benefit of being thin. Tungsten filaments on the order of a few micrometers in diameter are easily obtainable and exhibit the desired combination of low thermal capacity, rapid thermal response, high sensitivity to changes in temperature and outstanding robustness. Additionally filaments such as these exhibit minimal impact on the flow being measured. One skilled in the art will recognize that alternative filaments may be employed in practicing the present invention, including but not limited to other types of miniaturized metallic wire, such as Nickel-Chrome heating wire, to fibers coated with thin conductive films, or to microfabricated Silicon filaments. As a variety of heater materials exists, the material of the heater can be tailored to the specific operational environment such that measurements are optimized for an anticipated fluid composition which issues such as corrosion and abrasion are addressed.

AOne particular embodiment of the present invention involves fabrication of a micro fluidic flow rate sensor involving a device with very small channels (with width and depth on the order of a few hundred micrometers) and integrated heaters and detectors. Such heaters and detectors can either be disposed on a wall of a fluidic channel, on a membrane in the immediate proximity of a fluidic channel (such as described in E. Meng, Y.-C. Tai: "A PARYLENE MEMS FLOW SENSING ARRAY", Proceedings of the 12th International Conference on Solid State Sensors, Actuators and Microsystems, Boston, June 8-12, p. 686, 2003, hereby incorporated by reference), or by using MEMS structures suspended in the channel. MEMS stands for "micro electromechanical system", and it generically refers to devices that are batch fabricated using silicon micro-machining techniques, or similar technologies. A device with microchannels and suspended MEMS heaters and detectors is the preferred embodiment, as the heater and detector can be placed close to the center of the channel without creating significant perturbances to the fluid flow, thus increasing the sensitivity of the sensor.

In accordance with one embodiment of the present invention, the heater and detector are preferably chosen to have small thermal capacity. Low thermal capacity allows for a heater capable of producing large temperature variation in a very short time for use by the injection element. In contrast a low thermal capacity allows for the detection of small temperature variation by the detection element. Additionally, in one embodiment of the present invention, the physical size of the heater used by the injection element and detector used by the detection element should ideally also be very small, to provide a local measurement of flow velocity. Such measurements are typically preferred in a production environment of a deviated well, where the flow pattern across the production pipe may become extremely complex. In such cases, a mapping of the flow velocity across the pipe section can be very valuable.

The resistive heaters described above can be used not only as an injection element but also as a detection element in accordance with an embodiment of the present invention. Using a resistive heater as a detection element can be accomplished by monitoring the resistance of the heater. By monitoring resistance, the resistive heater has been transformed into a thermal transducer. As set forth prior, these resistive heaters may take numerous forms and may range in size. Convention hot wire filament heaters can be employed for fluids in production channels in accordance with one embodiment of the present invention, while MEMS heaters can be employed for measuring a flow parameter in a micro fluidic channel in accordance with an alternative embodiment of the present invention.

Figure 6:
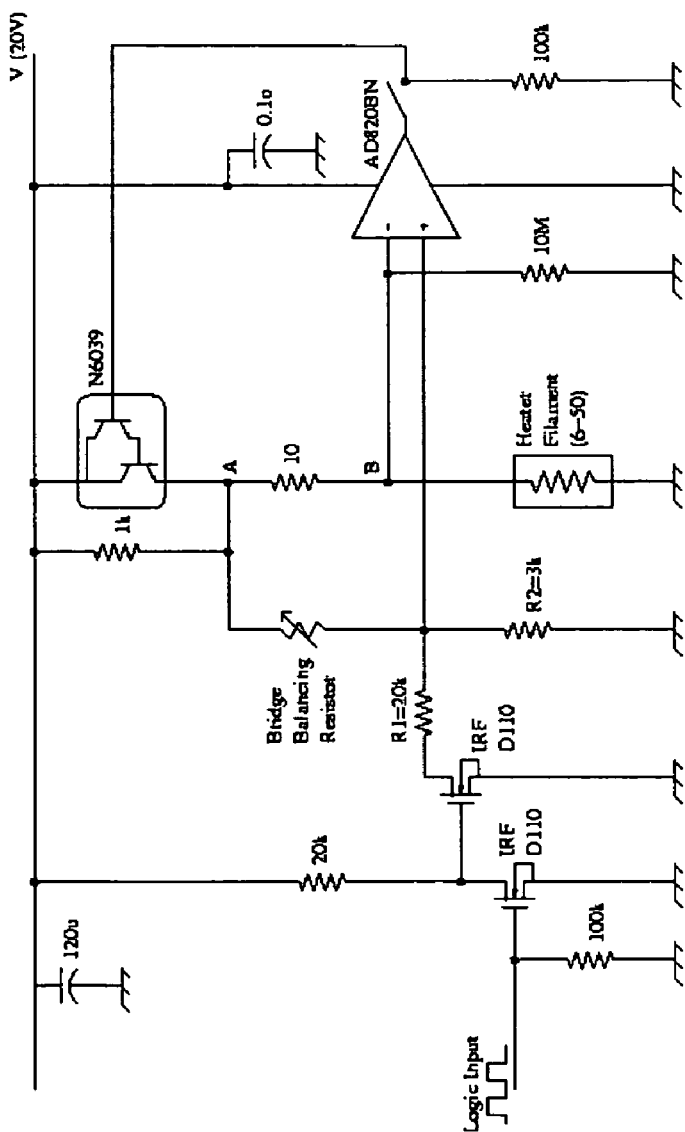
FIG. 6 is an electronic schematic of a suitable circuit for feedback control of a heater associated with an injection element in accordance with one embodiment of the present invention.
Figure 7:
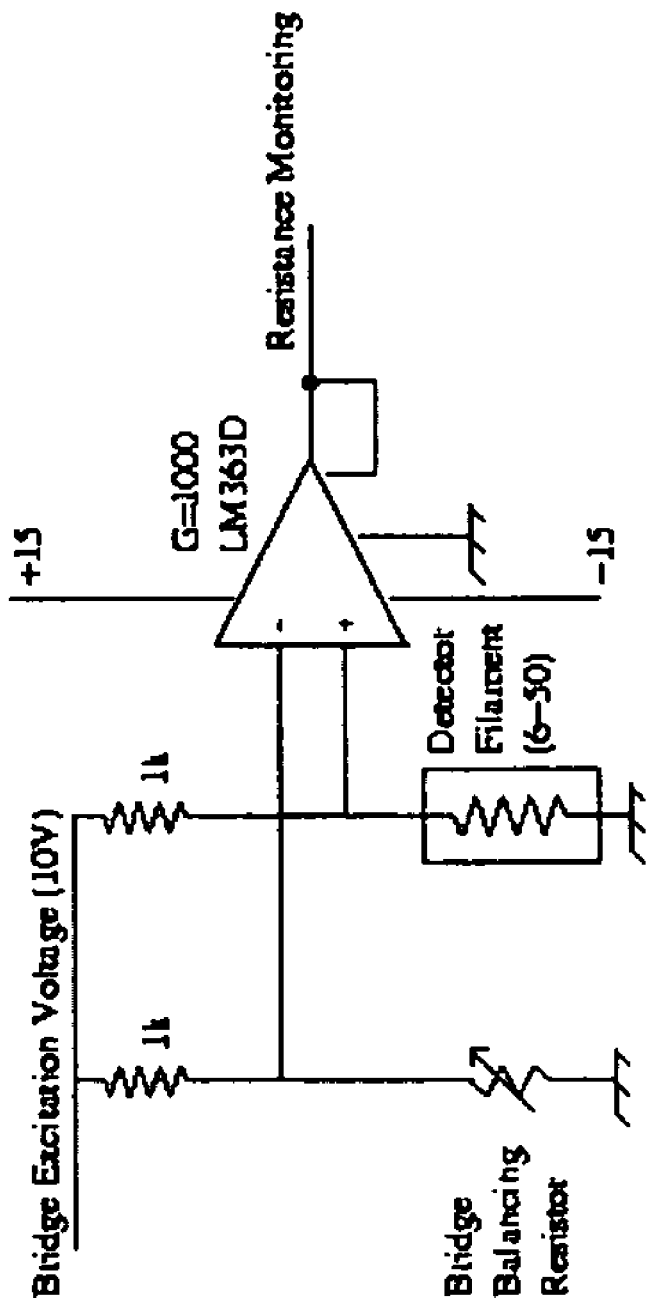
FIG. 7 is an electronic schematic of a suitable circuit for use as a resistance bridge and instrumentation amplifier in accordance with one embodiment of the present invention.

Inherent in the use of resistive heaters, for either injection elements, detection element or both, is the need for thermal management. Thermal management is necessary to protect the heater from thermal damage as the environment changes. For example, a change in the flowing fluid in the flow channel, such as when liquid around the heater is displaced by gas, requires that the heater temperature be adequately maintained. One such method by which this may be employed in practicing one embodiment of the present invention is the use of an electronic temperature control mechanism capable of maintaining the temperature of the heater constant. As understood by one skilled in the art, advances in electronics make such a temperature control almost trivial. For illustrative purposes, one suitable temperature control mechanism for use with an embodiment of the present invention is an electronic feedback loop. This loop may be implemented either as an analog circuit or digitally, as understood by a skilled artisan. One such suitable feedback control circuit for controlling the injection element and the associated heater of this injection element is illustrated in FIG. 6. Inherent in the use of a heater as an injection element is the provision that the heater temperature be maintained sufficiently low to avoid bubble generation at the injection element location. Such an illustration of FIG. 6 is one suitable example of a feedback control mechanism and is not intended to be limiting in scope of the present invention. Additionally, when employing a resistive heater as a detection element, suitable electronics may be necessary to amplify the resistance changes of the detection element. One example of such electronics is the resistance bridge and instrumentation amplifier illustrated in FIG. 7.

In accordance with an alternative embodiment of the present invention, the miniaturization made possible by the use of small heater-detector pairs may allow a large array of measurement points spanning the full flow channel cross-section in both the radial and the azimuthal direction to be measured. In a producing hydrocarbon well, for example, this provides the benefit of flow measurements in a variety of locations. Such measurements are essential for understanding the flow regimes and maximizing production of such wells. To date, the prior art has attempted such measurements using spinners for the same purpose. The Flow Scan Imager (FSI) of Schlumberger is one such example of a prior art attempt at flow measurements.

In an alternate embodiment of this invention, the use of micro fabricated MEMS devices may be utilized in measuring a parameter in a flowing fluid such as flow velocity. The application of a MEMS measuring device, in accordance with the present invention, provides for a means by which flow rate measurements may be scaled down to extremely small fluidic channels, such as those present in micro fluidic devices. In one embodiment of the present invention, the MEMS measuring device may be integrated with other existing sensors in a "lab on a chip" approach. Suitable "Lab on a Chip" systems are detailed in U.S. Patent Application Publication Number US-2006-0008382-A1, filed Jul. 6, 2004 and assigned to Schlumberger Technology Corporation, which is herein incorporated by reference.

When using a resistive heater as an injection element and detection element, a variety of parameters of a flowing fluid in a flow channel may be measured. Prior embodiments of the present invention have illustrated the measurement of a flow velocity. Such examples are not intended to be limiting in scope as they are solely one suitable parameter. In accordance with an alternative embodiment of the invention, wherein resistive heaters are used, the voltage to the heater can be monitored to provide valuable information about the thermal properties of the medium surrounding the heater.

Figure 8:
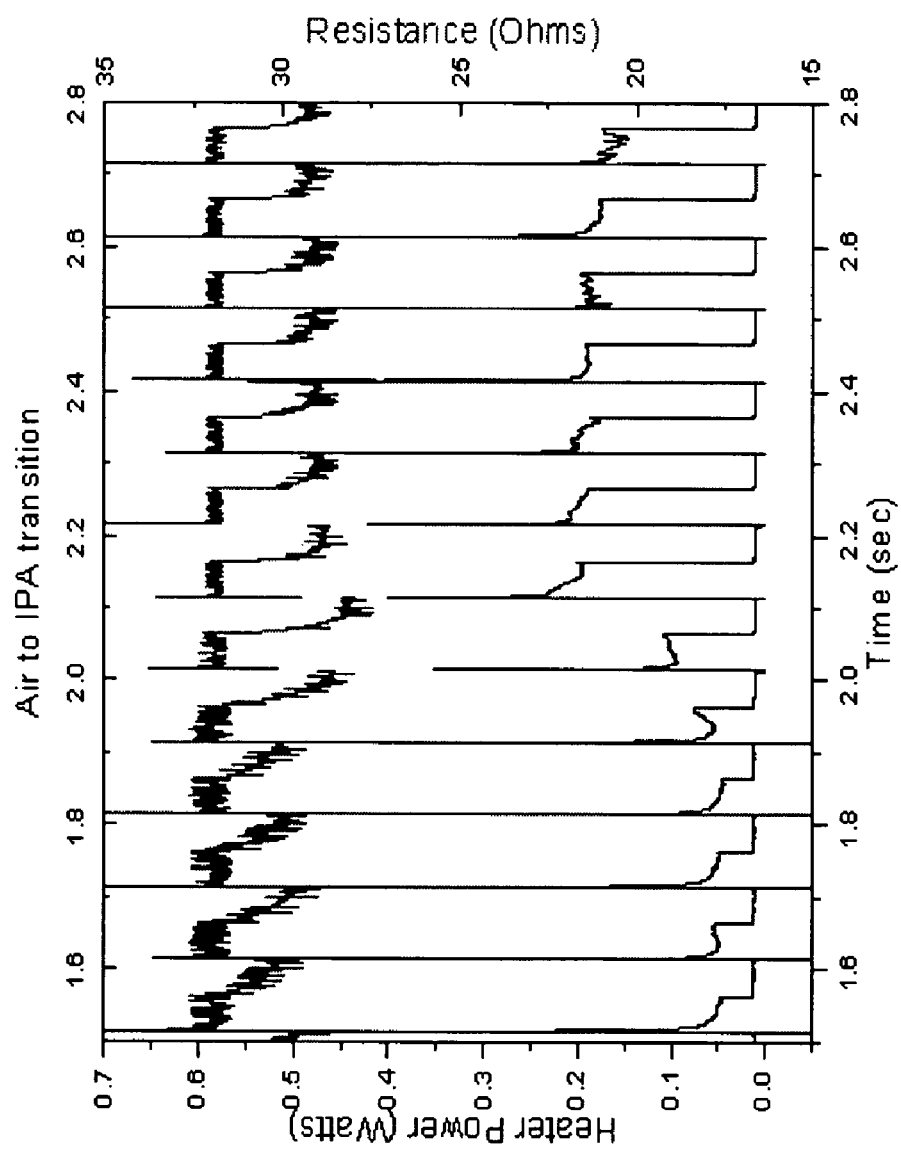
FIG. 8 is representation of data derived in accordance with the present invention wherein the transition from a gas to a liquid is illustrated.

For example, in accordance with an embodiment of the present invention at any given flow rate, the amount of power to the heater as well as the time decay constant depend on the thermal conductivity, as well as on the flow rate, of the fluid flowing past the sensor. Monitoring the power it takes to keep the heater at a constant temperature can therefore provide important information about the fluid surrounding the filament of the heater. More specifically, this monitored power consumption can be used to distinguish a low thermal conductivity from a moderate thermal conductivity fluid and further from a high thermal conductivity fluid. Examples of low thermal conductivity fluid are gasses. Examples of fluids with moderate thermal conductivity are fluids like hydrocarbon oils and examples of fluids with high thermal conductivity are fluids such as water. A heater operated in this mode can therefore be used as a phase-detection mechanism. FIG. 8 shows the behavior of the constant-temperature heater in mixed liquid and gas flow. It is apparent that heater power, as well as time decay constant, depends heavily on the phase of the fluid flowing by the heater, namely high power, fast decay for liquid and low power, slow decay for gas. The constant-temperature heater can therefore also be used as an oil-water-gas detector in multi-phase flow.

Those skilled in the art would recognize that this set-up may be otherwise configured to achieve adequate results in a variety of applications. For example, the flow channel dimensions may be altered to meet the needs of a particular application. Likewise, the distances between injection element (and associated heater) and detection element may be adjusted as required. It is further noted that the injection element and associated heaters and detector elements described herein are merely examples of suitable choices. One skilled in the art will readily recognize that other suitable alternative may be employed without deviating from the intended thrust of the present invention. Furthermore, in accordance with the present embodiment the scale of this gas detector or fluid identifier can range from convention resistive heater sizes for use in production logging operations to micro fluidic MEMS heating arrangements for use in micro fluidic measurements.

It is further understood that the measurement of flow rate in a certain application may involve additional hardware required to confine the flow to a narrower channel. This is particularly important in situations where the direction of the flow is not well known, and the axis of the heater—detector arrangement may be misaligned with the direction of the flow. By using a portion of a narrower channel (or tube), with the heater and detector disposed at opposite ends of the channel or tube, the chance that a heat pulse emitted by the heater will miss the detectors is greatly reduced. This of course applies to other types of tracers as well. One skilled in the art will readily recognize the need for this additional hardware. The present invention contemplates this need and hereby incorporates any addition plumbing or hardware as required in practicing the invention.

Figure 9:
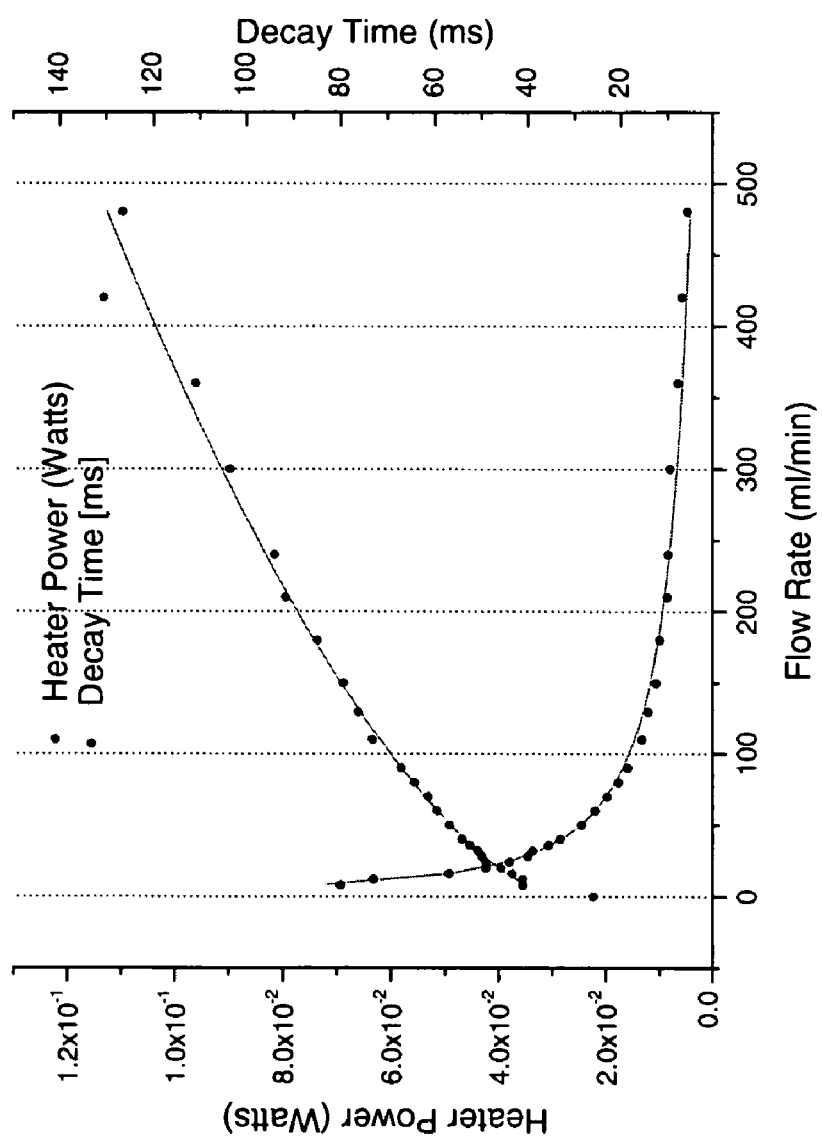
FIG. 9 is a depiction of the relationship between heater power and time decay constant on flow rate of a flowing fluid in a fluid channel.

One skilled in the art will recognize that the recited flow velocity, gas detection and fluid identification are not the only suitable parameters to be measured by the present invention. In accordance with an embodiment of the present invention, when utilizing a constant-temperature heater, for example, this constant-temperature heater can be used as an anemometer to detect flow. The power $P_H$ to maintain the heater at a constant temperature depends on the ability of the flowing fluid in the flow channel to transport heat away from the heater. Similarly, the time $\tau_H$ for the heater temperature to decay from a given high value to a lower value (when no power is being delivered to the heater) also depends on the ability of the flowing fluid in the flow channel to transport heat away from the heater. In low flow situations, most of the heat is transported by means of thermal diffusion, and therefore the power $P_H$ as well as the time decay constant $\tau_H$ are strongly related to the thermal conductivity of the flowing fluid in the flow channel. As the flow rate is increased, convective heat transport becomes dominant, and the power $P_H$ as well as time constant $\tau_H$ become much more sensitive to flow rate. The dependence of these parameters on flow rate of single phase hexadecane oil is represented in FIG. 9. In view of data derived in accordance with this embodiment of the invention, along with appropriate calibration, either time decay $\tau_H$ or heater power $P_H$ can be utilized to provide a reliable measurement of flow rate. The calibration may involve a measurement of time decay $\tau_H$ and heater power $P_H$ for a range of flow rates using the fluid of interest. Alternatively, if the above is not possible, calibration could be performed by correlating the results obtained by monitoring time decay $\tau_H$ and heater power $P_H$ and by employing the technique of thermal tracers elaborated prior. In accordance with this embodiment of the present invention, one skilled in the art will recognize that these measurements are extremely sensitive at very low flow rates. Additionally, the present embodiment is particularly relevant in low flow rate situations, allowing for a measurement of flow rate in situations where the length $T_{seq}$ of the injection sequence applies limitations to the time-of-flight method described above. In view of this, these measurements can additionally be utilized in conjunction with time-of-flight measurements to both extend time-of-flight measurements to include extremely low flow rates or may be used to complement the results from time-of-flight measurements recited herein.

Figure 10:
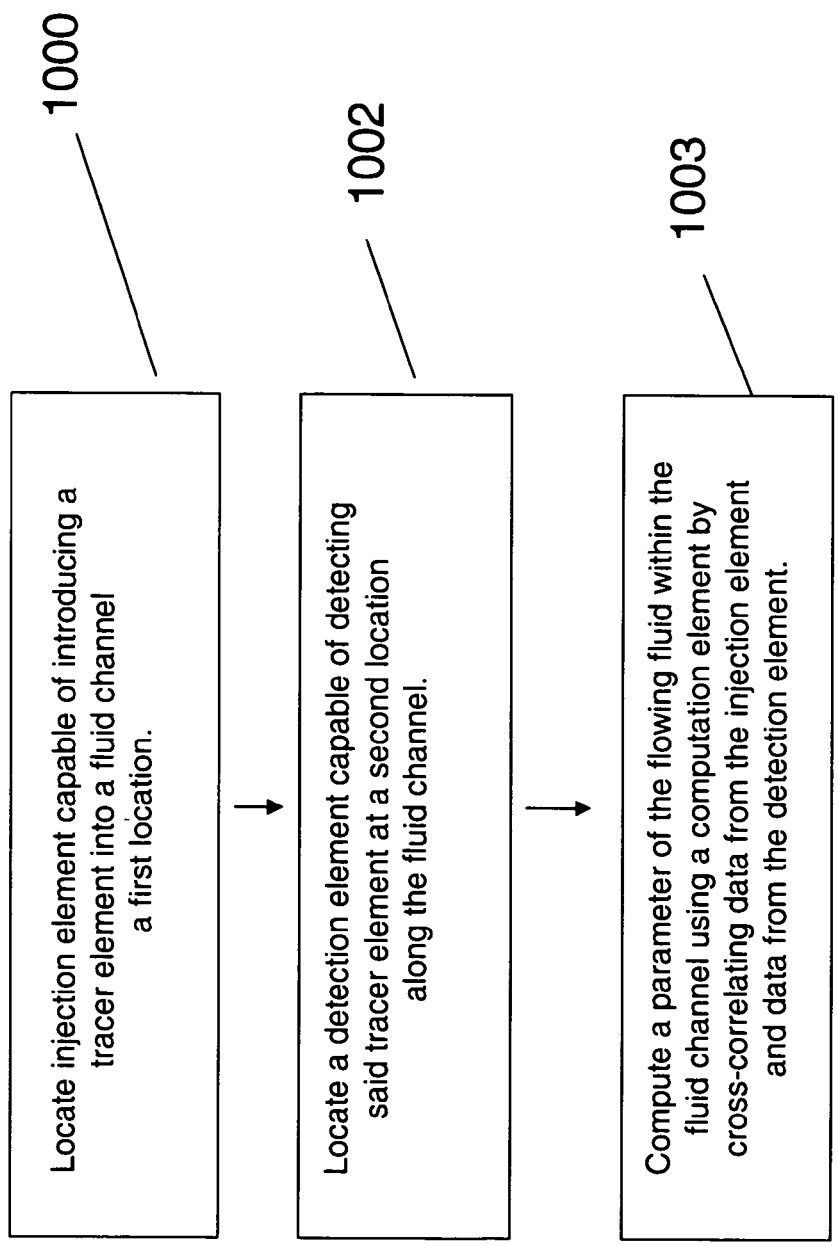
FIG. 10 is a flowchart illustrating the steps necessary in practicing one embodiment of the present invention.

FIG. 10 of the present invention illustrates a flowchart of the required steps used in practicing one embodiment of the method of the present invention. In accordance with step 1000 an injection element capable of introducing a tracer element into a fluid channel is located at a first location is recited. In accordance with step 1002 a detection element capable of detecting said tracer element is disposed at a second location along the fluid channel. A parameter of the flowing fluid within the fluid channel is then computed using a computation element as recited at step 1003 of FIG. 10. Calculation of this fluid parameter is accomplished by cross-correlating data from the injection element and data from the detection element. Alternatively, as detailed previously in FIG. 2B, one could introduce a tracer element into a fluid channel and use two or more detector elements to detect the signal, placed at two or more different locations along the fluid channel. The correlation of the two or more detected signals with the injected signal can be made individually, and the combined results can be used to obtain a more accurate estimate of a fluid parameter, such as flow rate.

The apparatus, systems and methods described above are particularly adapted for oil field and/or production logging applications. It will be apparent to one skilled in the art, however, upon reading the description and viewing the accompanying drawings, that various aspects of the inventive apparatus, systems and methods are equally applicable in other applications wherein measurement of a parameter of a lowing fluid is required. Generally, the invention is applicable in any environment or design in which measurement of a parameter of a flowing fluid, such as flow rate or fluid composition is desired.

The foregoing description is presented for purposes of illustration and description, and is not intended to limit the invention in the form disclosed herein. Consequently, variations and modifications to the inventive parameter measurement systems and methods described commensurate with the above teachings, and the teachings of the relevant art, are deemed within the scope of this invention. These variations will readily suggest themselves to those skilled in the relevant oilfield, fluid analysis, and other relevant industrial art, and are encompassed within the spirit of the invention and the scope of the following claims. Moreover, the embodiments described (e.g., a heat pulse and pseudo-random sequences such as M sequences) are further intended to explain the best mode for practicing the invention, and to enable others skilled in the art to utilize the invention in such, or other, embodiments, and with various modifications required by the particular applications or uses of the invention. It is intended that the appended claims be construed to include all alternative embodiments to the extent that it is permitted in view of the applicable prior art.

We claim:

1. A time of flight measurement apparatus for measuring a one or more parameter of a fluid moving through a fluid channel, comprising:
    a first location disposed along the fluid channel, wherein said first location includes an injection element capable of introducing a tracer element into the fluid channel at a known location;
    a second location disposed at a fixed distance from said first location, wherein the second location is capable of detecting the tracer element using a detection element; and
    a computation element in communication with the injection element of the first location and the detection element of the second location, wherein the computation element computes a cross-correlation function between the injected tracer element and the detected tracer element, and determines time-of-flight and the one or more parameter from cross-correlation peak position.

2. The apparatus of claim 1, wherein the flow channel is a micro fluidic channel.

3. The apparatus of claim 1, wherein the flow channel is a flow line in a downhole tool.

4. The apparatus of claim 1, wherein the flow channel is a flow passage in a production logging environment.

5. The apparatus of claim 1, wherein the first location includes one or more injection element, said one or more injection element in communication with the computational element for measuring the one or more parameter of the fluid.

6. The apparatus of claim 1, wherein the second location includes one or more detection element, said detection element in communication with the computation element for measuring the one or more parameter of the fluid.

7. The apparatus of claim 1, further comprising one or more detection element located at one or more location relative to the injection element and in communication with the computation element for measuring a the one or more parameter of the fluid.

8. The apparatus of claim 7, wherein said one or more location relative to the injection element is located upstream of the injection element.

9. The apparatus of claim 7, wherein said one or more location relative to the injection element is located downstream of the injection element.

10. The apparatus of claim 1, wherein the flow is a single phase flow in said flow channel.

11. The apparatus of claim 1, wherein the flow is a multi-phase flow in said flow channel.

12. The apparatus of claim 1, wherein said one or more parameter of a flow is flow rate.

13. The apparatus of claim 1, wherein said one or more parameter of a flow is flow composition.

14. The apparatus of claim 1, wherein said tracer element is a thermal marker.

15. The apparatus of claim 14, wherein said thermal marker is a pseudo-random sequence.

16. The apparatus of claim 14, wherein said thermal marker is a M-sequence.

17. The apparatus of claim 1, wherein said detection element is a temperature sensor.

18. The apparatus of claim 17, wherein said temperature sensor is a thermocouple.

19. The apparatus of claim 17, wherein said temperature sensor is a resistance sensor.

20. The apparatus of claim 1, wherein said injection element is a heater having a minimized thermal capacity.

21. The apparatus of claim 20, wherein said heater is a heating filament.

22. The apparatus of claim 20, wherein said heater is a MEMS heating device.

23. A method for measuring one or more parameter of a flowing fluid in a fluid channel using time of flight measurements, comprising the steps of:
    disposing at a first location along the fluid channel an injection element capable of introducing a tracer element into a fluid channel at a known location;
    disposing at a second location at a fixed distance from said first location a detection element capable of detecting the tracer element; and
    computing the one or more parameter of said flowing fluid using a computation element, wherein said computation element is in communication with the first location and the second location to calculate time of flight data, and computes a cross-correlation function between the iniected tracer element and the detected tracer element, and determines time-of-flight and the one or more parameter from cross-correlation peak position.

24. The method of claim 23, wherein the flow channel is a micro fluidic channel.

25. The method of claim 23, wherein the flow channel is a flow line In a downhole tool.

26. The method of claim 23, wherein the flow channel is a flow passage in a production logging environment.

27. The method of claim 23, wherein the first location includes one or more injection element, said one or more injection element in communication with the computational element for measuring a the one or more parameter of the fluid.

28. The method of claim 23, wherein the second location includes one or more detection element, the one or more detection element in communication with the computational element for measuring the one or more parameter of the fluid.

29. The method of claim 23, further comprising the step of locating one or more detection element at one or more location relative to the injection element and in communication with the computation element for measuring the one or more parameter of the fluid.

30. The method of claim 29, wherein the one or more location relative to the injection element is located upstream of the injection element.

31. The method of claim 29, wherein the one or more location relative to the injection element is located downstream of the injection element.

32. The method of claim 23, wherein the flow is a single phase flow in said flow channel.

33. The method of claim 23, wherein the flow is a multi-phase flow in said flow channel.

34. The method of claim 23, wherein said one or more parameter of a flow is flow rate.

35. The method of claim 23, wherein said one or more parameter of a flow is flow composition.

36. The method of claim 23, wherein said tracer element is a thermal marker.

37. The method of claim 36, wherein said thermal marker is a pseudo-random sequence.

38. The method of claim 36, wherein said thermal marker is a M-sequence.

39. The method of claim 23, wherein said detection element is a temperature sensor.

40. The method of claim 39, wherein said temperature sensor is a thermocouple.

41. The method of claim 39, wherein said temperature sensor is a resistance sensor.

42. The method of claim 23, wherein said injection element is a heater having a minimized thermal capacity.

43. The method of claim 42, wherein said heater is a heating filament.

44. The method of claim 42, wherein said heater is a MEMS heating device.

45. A time of flight measurement apparatus for measuring flow rate of a fluid in a flow channel, comprising:
    an injection element located at a first location along said flow channel, wherein said injection element is capable of introducing a tracer element into the flow channel;
    a detection element disposed at a second location relative to the first location, wherein the detection element is capable of detecting the tracer element; and
    a computation element in communication with the first location and the second location, wherein the computation element cross-correlates at least the tracer element introduced by the injection element with at least the tracer element detected at the detection element to calculate a time of flight measurement of flow rate of a fluid in the flow channel from cross-correlation peak position.

* * * * *